United States Patent [19]

McRobert

[11] 4,033,100
[45] * July 5, 1977

[54] WINDROWING MACHINE WITH ROTARY BRUSH AND DEPTH CONTROL UNIT

[75] Inventor: Leon R. McRobert, Ocoee, Fla.

[73] Assignee: FMC Corporation, San Jose, Calif.

[ * ] Notice: The portion of the term of this patent subsequent to Oct. 28, 1992, has been disclaimed.

[22] Filed: Apr. 17, 1975

[21] Appl. No.: 568,882

Related U.S. Application Data

[62] Division of Ser. No. 463,328, April 23, 1974, Pat. No. 3,914,925.

[52] U.S. Cl. .......................................... 56/328 R
[51] Int. Cl.² ........................................ A01D 51/00
[58] Field of Search ............. 280/12 R, 12 B; 56/328 R, 10.3, 327 R, 13.6; 172/111, 118

[56] References Cited

UNITED STATES PATENTS

| | | | |
|---|---|---|---|
| 3,066,745 | 12/1962 | Smith et al. | 172/118 |
| 3,190,364 | 6/1965 | Maloney | 172/111 |
| 3,415,043 | 12/1968 | Shones | 56/13.6 |
| 3,611,690 | 10/1971 | Zweegers | 56/366 |
| 3,762,140 | 10/1973 | Block | 56/328 R |
| 3,893,286 | 7/1975 | Buttram | 56/328 R |

*Primary Examiner*—Russell R. Kinsey
*Attorney, Agent, or Firm*—A. J. Moore; C. E. Tripp

[57] ABSTRACT

A windrowing machine includes a main rake and a reciprocable slide rake projecting outwardly and forwardly from the chassis of a mobile vehicle toward a row of trees being harvested. The rakes are partially supported in operative windrowing position by a generally horizontal boom which is hydraulically raised or lowered as required. The slide rake is pivotally connected to the boom and has its inner rear end supported by a caster wheel and its diagonally opposite outer forward end supported by a rotary depth control disc of a windrowing brush and depth control unit. The brush and depth control unit is driven by power means that includes a shaft which drives the brush and also drives the flat depth control disc. The disc is connected to the drive shaft of the power means by a universal joint. The plane of the brush is angled downwardly and forwardly approximately 10° relative to the horizontal for engaging and sweeping the fruit inwardly from its path, while the rotating disc assumes the average inclination of uneven soil upon which it rests by flattening the soil due to its rotation and universal mounting.

3 Claims, 4 Drawing Figures

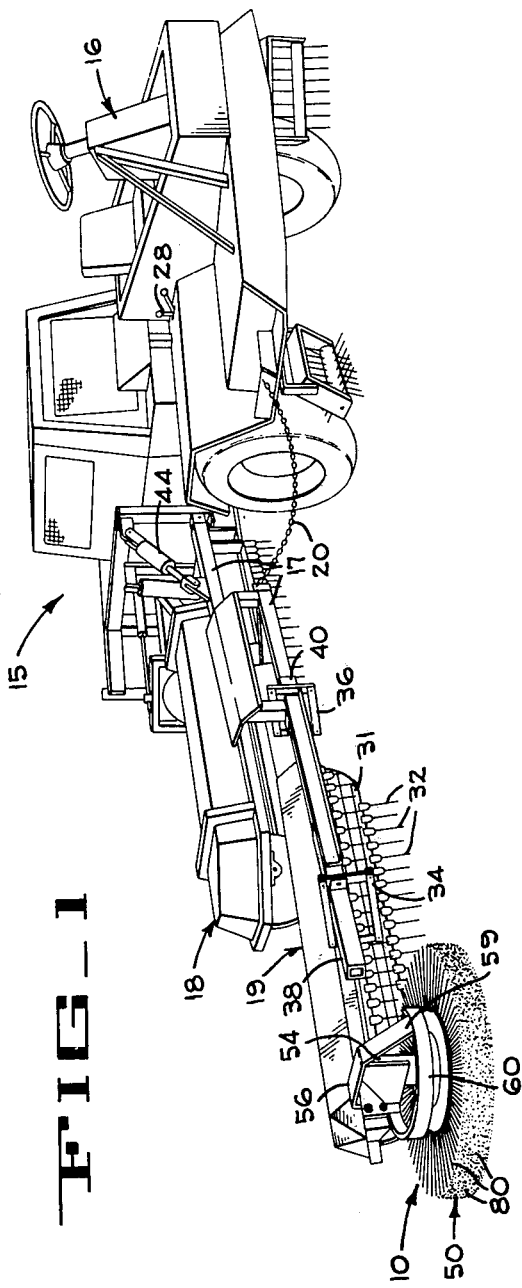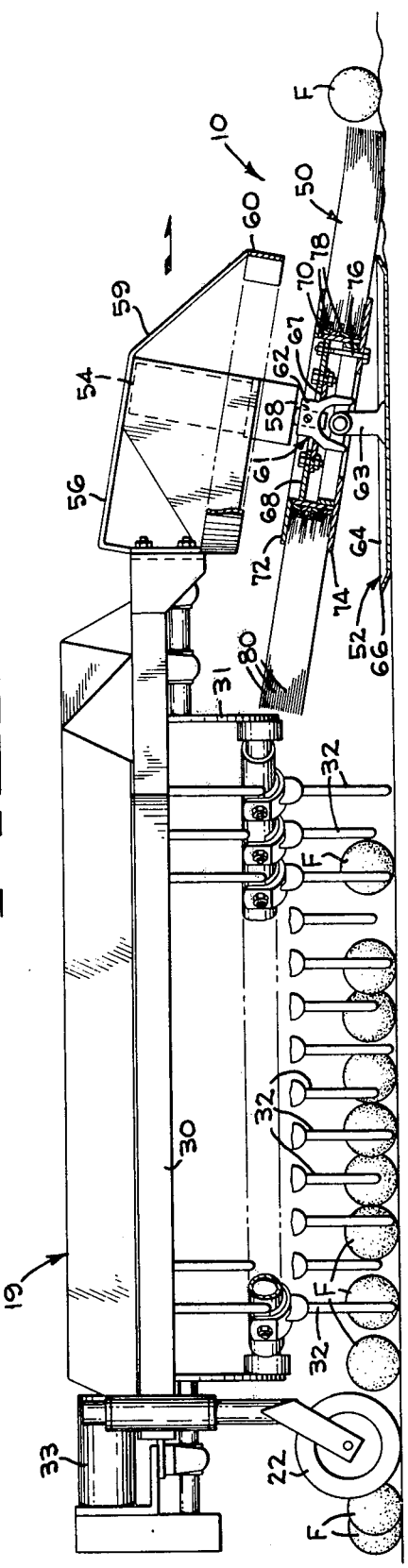

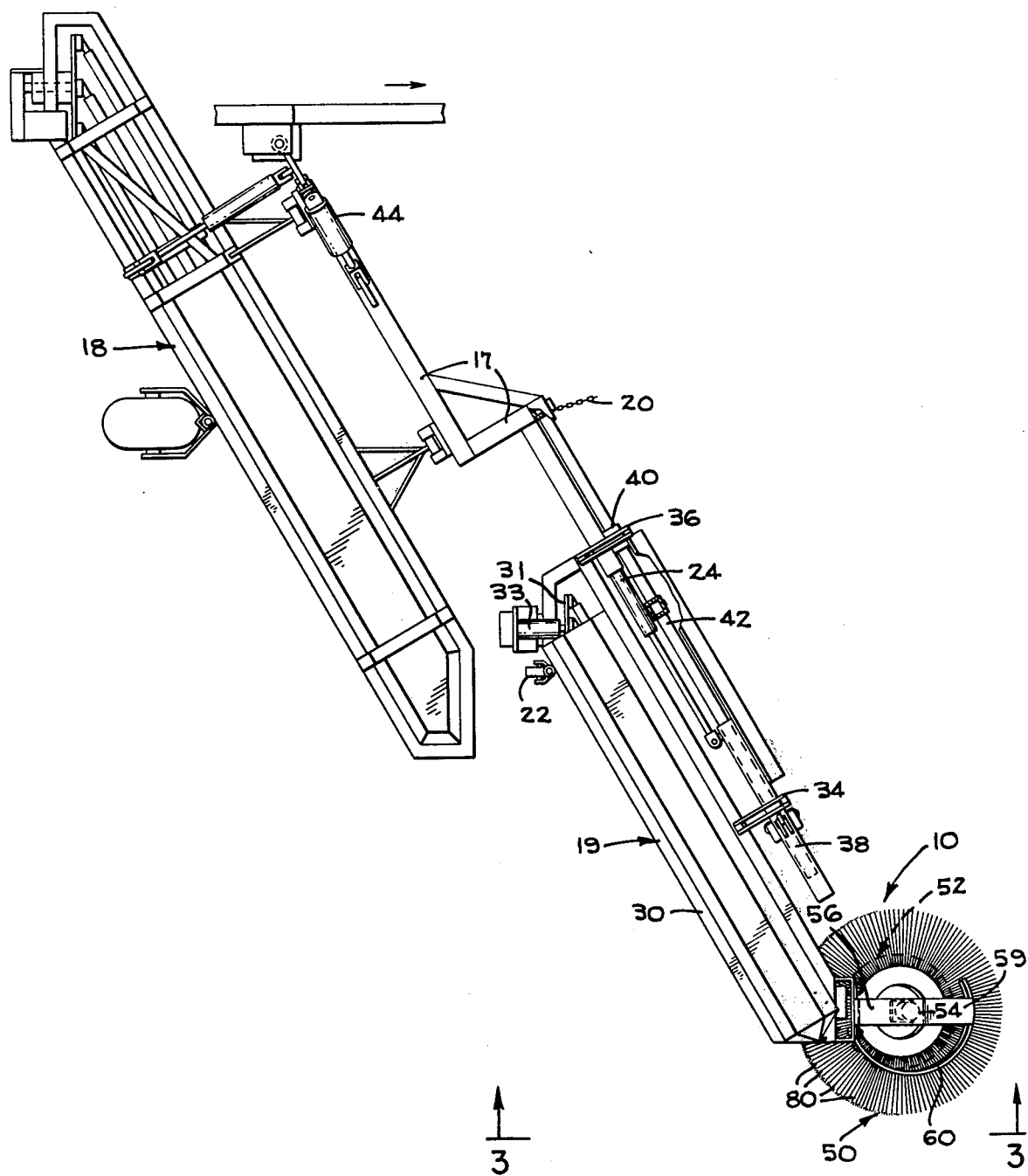

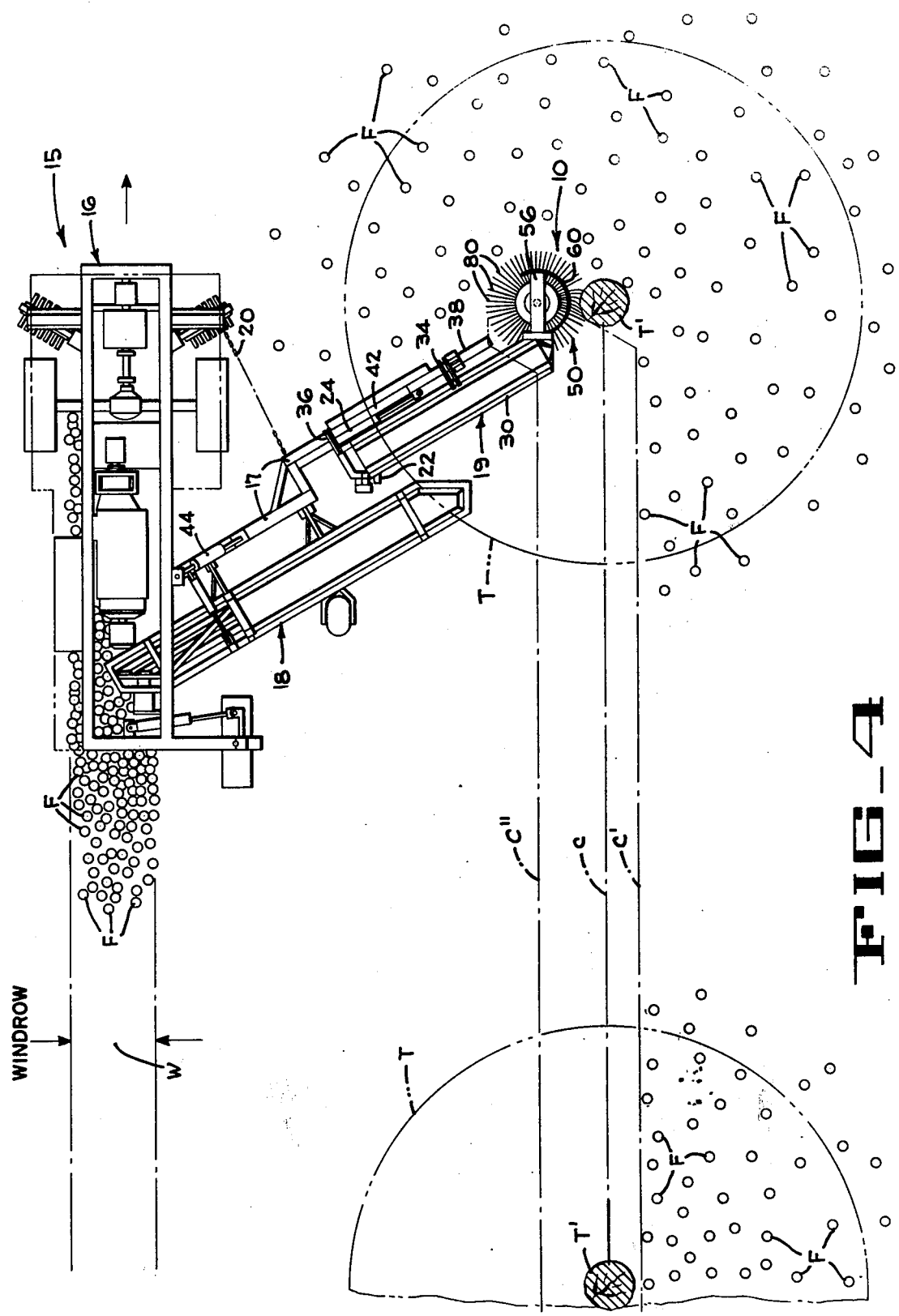
FIG_4

WINDROWING MACHINE WITH ROTARY BRUSH AND DEPTH CONTROL UNIT

This is a division, of application Ser. No. 463,328 filed Apr. 23, 1974 and now U.S. Pat. No. 3,914,925.

BACKGROUND OF THE INVENTION

1. Field of the Invention

This invention pertains to the windrowing art, and more particularly relates to a windrowing machine for fruit or the like having a rotary brush and depth control unit attached to the outer forward end thereof.

2. Description of the Prior Art

It is well known in the art to shake fruit, such as citrus fruit, from trees and to then move the fruit into windows for easy access to pickup machines. Such a windrowing machine is disclosed in U.S. Pat. No. 3,762,140 which issued to Donald P. Block on Oct. 2, 1973 and is assigned to the assignee of the present invention.

Two substantial problems exist when windrowing orchard crops. The first problem is to reliably maintain the fruit engaging members of the windrower in windrowing position relative to the ground when the ground is not level but includes high and low areas; or when the ground is generally level but contains a substantial number of clods, rocks, clumps of grass or the like. Another problem is to gently move the fruit from a path which includes the centerline of the trees being harvested, inwardly from that path without damage to the fruit or to the trees.

Windrowers which mount a series of driven brushes rididly secured to and supported by convex discs, with the brushes spaced along an axis angled relative to the direction of movement of a towing vehicle are also known. However, the gradual accumulation of articles being windrowed, which articles progressively move from brush to brush, tends to overload the innermost brush rendering the machine undesirable for many harvesting uses.

Patents such as Reynolds U.S. Pat. No. 348,778 disclose a street sweeping apparatus including a series of brushes supported on a vehicle at an angle relative to the direction of movement of the vehicle, while the patent to Teagle U.S. Pat. No. 3,527,040 discloses a foot pad of convex arcuate configuration for preventing the tines of a hay-tedder from digging into the ground. The patent to Keogh U.S. Pat. No. 2,655,678 discloses a small roller or pilot wheel which leads a roadway sweeping broom for controlling the elevation of the broom.

SUMMARY OF THE INVENTION

The windrowing machine includes a generally horizontal frame connected to and projecting outwardly from at least one side of a mobile vehicle. Means for sweeping articles along the ground are connected along the length of the frame and a flat circular disc is connected to support the frame at the outer end. The disc is secured to a driver shaft through a universal joint thus not only permitting the rotating disc to seek the average elevation of uneven or rough, cloddy ground, but also to serve as a means for leveling the ground upon which it rotates.

The depth control mechanism is used in conjunction with the windrower for maintaining one end of the horizontal frame at a desired average windrowing height relative to the ground. The mechanism is mounted on the outer forward end of the horizontal frame while the other end of the frame is mounted on the mobile vehicle It is therefore an object of the present invention to provide a rotary depth control unit with the depth control mechanism being in the form of a flat disc connected to a drive shaft by a universal joint.

BRIEF DESCRIPTION OF THE DRAWINGS

FIG. 1 is a perspective of a windrowing machine in operative position and having the rotary brush and depth control unit of the present invention incorporated therewith.

FIG. 2 is a plan of the main rake, slide rake, and bruch and depth control unit illustrating the relative position of the windrowing components.

FIG. 3 is an enlarged end view taken looking in the direction of the arrows 3—3 of FIG. 2 illustrating the structure for supporting the slide rake and brush at the desired windrowing elevation, the brush and depth control unit being illustrated in central section.

FIG. 4 is an operational view in plan illustrating the windrowing operation and the path of movement of the brush and depth control unit relative to the tree row centerline.

DESCRIPTION OF THE PREFERRED EMBODIMENT

The rotary brush and depth control unit 10 (FIGS. 1 and 4) of the present invention is associated with a windrowing machine 15 for windrowing citrus fruit F previously shaken upon the ground from rows of trees T having trunks T' planted along the row centerline C. The machine 15 is designed to rake fruit from between the trees T along the tree row centerline as well as from the area under the half row being raked, and to deposit all of this raked fruit into a single non-wavy windrow W. Although the windrowing machine 15 will be described in the specification as handling citrus fruit, it will be understood that the machine may also handle other types of articles such as deciduous fruit and nuts, and even non-agricultural articles.

In general, the windrowing machine 15 (FIGS. 1 and 4) comprises a three-wheeled vehicle 16 having a generally horizontal boom assembly 17 pivotally connected thereto and projecting outwardly from one side thereof. A main non-reciprocating rake 18 and reciprocable sliding rake 19 are partially supported by the boom assembly 17 and are maintained in operative raking position angled outwardly and forwardly relative to the longitudinal axis of the vehicle by a connector such as a chain 20. The length of the chain may be varied to adjust the angle of the rake relative to the longitudinal axis of the vehicle 16 so that a portion of the brush and depth control unit 10 will normally extend beyond the centerline C of the tree row being raked, as indicated by line C' in FIG. 4, when the vehicle is being driven midway between two trees. The path of movement of the brush is indicated by lines C' and C''.

The brush and depth control unit 10 of the present invention is mounted on the outer end of the slide rake 19 and cooperates with the diagonal opposite leveling device or caster wheel 22 to maintain both the brush and slide rake at a desired windrowing elevation relative to the surface of the ground which is not flat but varies in elevation and may include level disrupting clods and rocks or the like. The slide rake, and brush and depth control unit 10 are reciprocated by a manually controlled hydraulic cylinder 24 (FIG. 2) outwardly of the tree row centerline in response to manual control of a valve 28 (FIG. 1) by the operator when the brush approaches a tree trunk T (FIG. 4). It will be understood however, that the bristles of the brush are allowed to contact and move around the tree trunk to sweep fruit away from the trunk T''. The slide rake 19 and unit 10 are thereafter returned to their extended position when the unit 10 has moved past the tree trunk by reverse manual operation of the control valve 28.

Since the major portion of the windrowing machine is the same or substantially the same as that disclosed in the aforementioned Block U.S. Pat. No. 3,762,140, the description of the Block patent is incorporated herein by reference.

The slide rake 19 (FIG. 2) includes an elongated frame 30 (FIGS. 2 and 3) having a reel 31 with a plurality of rows of picking fingers 32 projecting downwardly. The reel is journaled on the frame 30 and is driven by a hydraulic motor 33. The forward portion of the frame is connected by parallelogram linkages 34 and 36 to tubular slides 38 and 40 of rectangular cross section that are slidably received on a rectangular member 42 (FIG. 2) of the boom assembly 17. During the windrowing operation the boom assembly is held by a hydraulic lift cylinder 44 in a generally horizontal position to allow the parallelogram linkages 34 and 36 to permit limited upward or downward movement of the slide rake 19 in order to compensate for variations in the contour of the ground.

It is, of course, apparent that the picking fingers 32 must maintain a relatively constant height above the ground, which may vary in contour, in order to avoid moving over fruit F in a depression and digging into the soil when an elevated portion is reached. For this reason, a leveling device such as the caster wheel 22 is connected to the rear inner portion of the frame 30 and cooperates with the brush and depth control unit 10, which is mounted on the diagonally opposite portion of the frame 30, to maintain the fingers 32 in their desired windrowing position relative to the ground. Since the brush and depth control unit 10 is in front of the slide rake 19, the unit encounters variations in contour before the slide rake reaches them, and tends to flatten the variations as will be made apparent hereinafter.

The rotary brush and depth control unit 10 (FIGS. 2 and 3) comprises a brush 50 and a leveling mechanism 52 both driven by a hydraulic motor 54. The motor 54 is secured to a sub-frame 56 that is bolted to the forward outer corner of the slide rake frame 30 so that the upstanding drive shaft 58 of the motor is angled rearwardly and downwardly about 10° relative to the vertical as indicated in FIG. 3. The sub-frame 56 includes an angled upper shield 59 and an arcuate strap 60 for deflecting tree limbs or the like away from the unit 10. A universal joint 61 has its upper portion 62 rigidly secured to the drive shaft 58 and has its lower portion 63 rigidly secured to the leveling mechanism 52 which includes a flat, circular, vehicle supporting or depth control disc 64 having an annular upturned peripheral flange 66 which aids in guiding the flat rotating disc over the ground. The brush 50 includes a mounting annulus 67 welded to the upper portion 62 of the universal joint to which is bolted an outer annulus 68 having a brush centering ring 70 welded thereto and concentric with the shaft 58. An upper brush retaining flange 72 is welded to the upper end of the ring 70 and cooperates with a lower annulus 74 connected to the annulus 68 by bolts 76 for clamping a plurality of bristle supporting channels 78 therebetween. The bristles 80 of the brush 50 project outwardly beyond the disc 64 as indicated in FIG. 3 to engage and sweep the fruit inwardly.

In operation, the windrower 15 is driven between the rows of trees from which fruit F has been previously shook as indicated in FIG. 4. The operator manually controls the slide rake reciprocating cylinder 24 causing the slide rake and attached brush and depth control unit to first sweep the fruit from the centerline C of the tree rows and to then retract away from each tree trunk T' about 6 to 10 inches as diagrammatically indicated by lines C' and C'' in FIG. 4. During this operation the brush bristles actually contact the trunk T' of the tree and will deflect about 6 inches thus assuring that fruit immediately adjacent the trunk will be windrowed. It will be noted that the path swept by the brush 50, as indicated by the space between lines C' and C'' in FIG. 4, overlaps the outer end of the slide rake 18. By positioning the brush 50 so that it will sweep the fruit F free from the outer end of the slide rake 19, it will be apparent that fruit will not be in position to be impaled or otherwise damaged as the rake fingers 32 move downwardly into windrowing position at the far outer end of the slide rake, which outer end is not shielded by other forward fingers already in the raking position as is the case with the inner portions of the slide rake 19.

Another important feature of the invention is that the rotating flat disc 64 of the depth control mechanism 52 contacts a relatively wide area of the ground, and because of its rotation and connection to the drive shaft by a universal joint 61, tends to flatten the soil upon which it rides. In this regard, it should be pointed out that a slight ridge and an adjacent gulley are quite frequently present immediately adjacent the tree row centerline because prior to harvesting the soil is prepared by discing, and/or rolling or slabing. These ground preparation implements are pulled through the orchard parallel to the tree rows and, accordingly, tend to leave uneven portions at their outer ends adjacent the tree row centerline. Since the flat disc rides on and flattens the ground forwardly of the outer slide rake in an area where the ground is apt to be quite uneven, it is apparent that the ability of the rotating disc to flatten and also level the soil is very important. It is also apparent that the disc very accurately maintains the windrowing depth for not only the brush but also for the outer end portion of the slide rake while the inner end portion of the rake is maintained at the desired level by the caster wheel 22. It will be recognized that if the rotating disc is moving along an inclined surface, for example up a hill, the disc will tend to flatten the inclined surface upon which it rides but does not tend to level that surface. Thus, the plane of the disc will tend to be substantially parallel to the average plane of the surface upon which it rides.

From the foregoing description it will be apparent that the rotary brush and depth control unit is mounted on the forward outer end of the slide rake and not only accurately controls the depth of the brush but also cooperates with the leveling device 22 to more accurately control the depth of the slide rake than has heretofore been believed possible. This accurate leveling is made possible by rotating the flat disc which is mounted for universal movement thereby tending to level the soil upon which it rides thus accounting for the improved depth controlling accuracy. Since the brush and depth control unit is mounted in front of the leading outer end of the slide rake, the brush sweeps all fruit clear of the outer end of the slide rake thus minimizing damage to the fruit and also effectively windrowing the fruit that lies in the tree row centerline.

Although the rotating disc is described in its preferred embodiment as a depth control device for controlling the height of a windrowing brush or rake relative to the ground, it will be understood that the disc may be used in other environments. For example, the driven upright shaft with its universally mounted flat disc may be used to support any type of vehicle on soft surfaces such as soft or wet land, marsh lands, ice, or snow. It is also apparent that the device will work on flat surfaces as well as surfaces that vary in elevation and that a wheel and tire may be substituted for the brush to act as a ground engaging drive means.

Although the best mode contemplated for carrying out the present invention has been herein shown and described, it will be apparent that modification and variation may be made without departing from what is regarded to be the subject matter of the invention.

I claim:

1. In a windrowing machine for windrowing articles lying on the ground, which machine includes a mobile vehicle movable along a relatively soft article supporting surface, mechanism comprising; a generally horizontal frame pivotally connected to said vehicle and projecting outwardly from one side thereof and forwardly with respect to the direction of motion of the vehicle, means connected along the length of said frame for sweeping articles along said article supporting surface, a driven upstanding shaft journaled on said frame at the other end thereof, a flat circular frame supporting disc, and universal joint means connecting said disc to said shaft for rotation therewith and for universal movement relative thereto with the flat surface of the disc riding on said soft supporting surface.

2. An apparatus according to claim 1 wherein said flat frame supporting disc includes an upstanding annular flange around its periphery to aid in flattening the soil upon which it rides thereby more uniformly distributing the weight of the frame over the entire area of the supporting surface of said disc.

3. An apparatus according to claim 1 wherein said driven upstanding shaft is angled about 10° from the verticle to define an acute angle between the plane of said disc and the axis of said shaft.

* * * * *